United States Patent [19]

Hair et al.

[11] Patent Number: 4,705,567
[45] Date of Patent: Nov. 10, 1987

[54] INK JET COMPOSITIONS WITH INSOLUBLE DYE COMPLEXES

[75] Inventors: Michael L. Hair, Oakville; Kar P. Lok, Sarnia; Francoise M. Winnik, Toronto, all of Canada

[73] Assignee: Xerox Corporation, Stamford, Conn.

[21] Appl. No.: 919,932

[22] Filed: Oct. 17, 1986

[51] Int. Cl.$^4$ .............................................. C09D 11/00
[52] U.S. Cl. ...................................... 106/20; 106/22; 106/23; 106/308 Q
[58] Field of Search ................... 106/20, 22, 23, 308 Q

[56] References Cited

U.S. PATENT DOCUMENTS

| 3,705,043 | 12/1972 | Zabiak et al. | 106/20 |
| 3,846,141 | 11/1974 | Ostergren et al. | 106/22 |
| 4,184,881 | 1/1980 | Bradley | 106/20 |
| 4,259,675 | 3/1981 | Mansukhani | 346/1 |
| 4,267,088 | 5/1981 | Kempf | 106/20 |
| 4,279,653 | 7/1981 | Makishima et al. | 106/20 |
| 4,395,287 | 7/1983 | Kobayashi et al. | 106/22 |
| 4,409,040 | 10/1983 | Tabayaski et al. | 106/20 |
| 4,421,559 | 12/1983 | Owatari | 106/20 |
| 4,500,355 | 2/1985 | Shimada et al. | 106/20 |
| 4,508,570 | 4/1985 | Fujii et al. | 106/20 |
| 4,585,484 | 4/1986 | Haruta et al. | 106/22 |
| 4,620,876 | 11/1986 | Fujii et al. | 106/20 |

Primary Examiner—Paul Lieberman
Assistant Examiner—Willie J. Thompson
Attorney, Agent, or Firm—E. O. Palazzo

[57] ABSTRACT

A heterophase ink composition comprised of water and a dye covalently attached to a component selected from the group consisting of poly(ethylene glycols) and poly(ethylene imines), which component is complexed with a heteropolyanion.

13 Claims, No Drawings

INK JET COMPOSITIONS WITH INSOLUBLE DYE COMPLEXES

BACKGROUND OF THE INVENTION

The present invention is generally directed to compositions particularly useful as marking materials in various imaging system, and more specifically the present invention is directed to heterophase ink compositions useful in ink jet printing systems, and to processes for the preparation of these compositions. Accordingly, in one embodiment of the present invention, there are provided heterophase colored ink compositions comprised of an aqueous suspension of dyes covalently attached to component which have been complexed with a hetropolyanion. The aforementioned inks possess excellent waterfastness characteristics, excellent dot and edge definition, and permit decreased ink spreading. Also, the heterophase ink compositions of the present invention enable the print quality of the images generated to be of high resolution, which images are independent of the ink paper interaction, thus allowing these inks to be selected for plain paper marking technologies.

Compositions useful in ink jet printing systems generally contain therein water soluble dyes. Thus, there is disclosed, for example in U.S. Pat. No. 3,846,141, an ink jet composition comprised of an aqueous solution of a water-soluble dye and a humectant material formed of a mixture of a lower alkoxy triglycol, and at least one other compound selected from the group consisting of a poly(ethylene glycol), a lower alkyl ether of diethylene glycol, and glycerol. According to the disclosure of this patent, the printing inks viscosity is subjected to little variation with use as water is lost by evaporation during recirculation of the ink composition through the jet printer. Moreover, apprarently the humectant system disclosed in this patent substantially prevents or minimizes tip dying of the printing ink in the orifice or nozzle during down time of the printer, such as when the printer is rendered inoperative. As further disclosed in this patent, the basic imaging technique in jet printing involves the use of one or more ink jet assemblies connected to a pressurized source of ink. Each individual ink jet includes a very small orifice usally of a diameter of 10 to 200 microns which is energized by magneto restrictive piezo-electric means for the purpose of emitting a continuous stream of uniform droplets of ink at a rate of 33 to 75 kilohertz. This stream of uniform droplets is desirably directed onto the surface of a moving web of, for example, paper; and is controlled to form printed characters in response to video signals derived from an electronic character generator and in response to an electrostatic deflection system; or drop on demand ink propulsion system.

Also, there is disclosed in U.S. Pat. No. 4,279,653 ink jet compositions with water soluble wetting agents a water soluble dye and an oxygen absorber. Similarly, U.S. Pat. No. 4,196,007 describes an ink jet printing composition containing an aqueous solution of a water soluble dye and a humectant consisting of at least one water soluble unsaturated compound. Other prior art disclosing aqueous inks for ink jet printing include U.S. Pat. Nos. 4,101,329; 4,290,072 and 4,299,630. In addition, there is illustrated in U.S. Pat. Nos. 3,705,043; 3,846,141; 4,259,675; and 4,409,040 the use of phosphonates and phosphites, and the use of poly(ethylene glycols) in ink jet marking materials.

Ink compositions for jet printing can be prepared by a number of known methods. Generally, these methods involve dissolving the various dyes, humectants, viscosity control agents, paper fixing additives, surface tension control additives, biocides and anti-oxidants in a known volume of water, followed by adjusting the pH and concentration of the solution to desirable levels. All of the prior art ink compositions disclosed herein are comprised of a solvent vehicle, such as water, ethylene gylcol, and dimethyl sulfoxide; and a molecularly dissolved dye. The dyes selected for these inks must be of a sufficient polarity to enable their dissolution in the solvents selected. Accordingly, images obtained with these ink compositions usually have poor waterfastness characteristics. Additionally, extensive dye and solvent diffusion into the paper substrate causes undersirable ink spreading thereby resulting in low image resolution, and inferior edge acuity.

In those situations wherein the colorants selected are not water soluble, such as those containing pigments, the inks can be prepared by standard known milling processes. However, these pigment dispersions are generally not sufficiently stable; accordingly, when incorporated into a printing machine, the ink particles tend to agglomerate resulting in the clogging of the small nozzles present in the ink jet devices.

Further, in U.S. Pat. No. 3,346,494 there is described a process for preparing stable microemulsions by the addition of a dispersable phase to a continuous phase to which has been added a selected combination of microemulsifiers. Examples of the dispersable phase include liquid hydrocarbons such as benzene, and contain an oil soluble rather than a water soluble dye. The micromulsifier used in the process of the '494 patent is apparently comprised of three ingredients; namely, a fatty acid, an amino alcohol, and an alkyl phenol, reference the disclosure in column 1 beginning at line 64.

Moreover, there is described in copending application U.S. Ser. No. 822,173, the disclosure of which is totally incorporated herein by reference, a heterophase ink composition comprised of a water insoluble polymer dispersed in a liquid medium, the polymer containing therein an oil soluble dye, and a nonionic stabilizer permanently attached thereto. The present invention also uses two-phase ink compositions, however, the solid particles selected are insoluble complexes of dyes and inorganic materials rather than colored polymeric particles. Insoluble complexes selected for the inks of the present invention present several advantages in that, for example, the insoluble aggregates are of a desirable smaller size, from about 0.08 to 0.8 microns average diameter, thus reducing or eliminating clogging of the print head nozzles. Also, the insoluble complexes of the present invention are colored as they are formed, therefore, there is no need for a separate dyeing step. Furthermore, the choice of dye is not restricted to oil-soluble dyes, and the complexes have a high affinity with the paper rendering the prints very permanent through excellent adhesion of the complexes to the paper.

In addition, there is disclosed in U.S. Pat. No. 4,246,154 a process for permitting the formulation of ink jet compositions from vinyl polymer latices by a dye imbibition technique. The aforementioned anionically stabilized latices which are obtained by emulsion polymerization are colored with a dye imbition process. Coloring processes as illustrated in Konishiroku EP Publication No. 0.068,9003 and DE No. 3,233,555 are similar to the '154 patent ink jet procedures with the exception that there is used in the latter a preformed polyurethane latex.

Further, disclosed in copending application U.S. Ser. No. 553,598, entitled Ink Jet Compositions and Processes for Preparation, the disclosure of which is totally incorporated herein by reference, is an ink composition comprised of polymers having dissolved therein oil soluble dyes; and containing surfactants, which composition is dispersed in an aqueous medium. Specifically disclosed in this copending application is an ink composition useful for jet printing processes comprised of a water insoluble polymer dispersed in an aqueous solution, the polymer containing therein an oil soluble dye in an amount of from about 5 percent by weight to about 25 percent by weight; and surfactant particles in an amount of from about 1 percent by weight to about 10 percent by weight. Additionally, disclosed in the aforementioned copending application is a process for the preparation of particles for ink jet printing which comprises (1) providing a monomer having dissolved therein oil soluble dye; (2) dissolving polymerization initiator into the monomer; (3) mixing the resulting solution with water containing a surface active agent therein; (4) subjecting the resulting mixture to ultrasound vibrations while simultaneously or subsequently heating the mixture to affect polymerization, thereby resulting in polymer particles containing the oil soluble dye and surface active agent, which particles are essentially monodispersed and are of a diameter of from about 0.03 micron to about 2 microns. The size of the particles produced in the process of the aforementioned copending application is determined by the mechanical homogenization process while with the process of the present invention particle sizes are dependent primarily on the chemical composition of the reactants. A large variety of dyes can thus be selected since the dyes need not withstand the oxidative environment of a polymerization medium, nor satisfy the solubility requirements related to the dyeing of polymeric particles.

Although the above compositions are suitable for their intended purposes, there continues to be a need for new inks for jet printing, and processes for preparing these compositions. Additionally, there continues to be a need for ink jet compositions which when in use result in superior optical print densities, and have excellent waterfastness characteristics. Moreover, there continues to be a need for inks that contain insoluble dye complexes therein, and wherein these complexes are of desired particle diameter sizes. Further, there is a need for ink compositions with, for example, a diameter of 0.8 micron or less which contain therein insoluble dye complexes and are waterfast, have an excellent affinity for paper substrates, and superior drying times. There is also a need for ink jet compositions with dye complexes wherein the colorant can be localized therein. Also, in accordance with the present invention, there are provided inks desirably containing therein complexed dyes thus enabling the dye to be chemically protected, and further preventing such materials from affecting the surface tension of the particles involved. Additionally, when these compositions impinge the paper substrate during jet printing, there is precipitated immediately on the fibers the ink particles, primarily in view of the colloidal characteristics of these particles. Accordingly, such particles separate from the colorless suspending fluid rather than undesirably penetrating into the paper. With penetration there occurs the known problems of show through, feathering, or chromatographic separation of the dye components. In this regard, it is difficult to prepare waterfast images from water soluble dyes since the ink jet compositions are complex in that in addition to the dyes incorporated therein they contain additives to prevent oxidation thereof, additives for fixing and for controlling viscosity of the liquid ink particles, as well as additives for controlling the evaporation rate and biological activities thereof.

In addition, several of the prior art ink compositions described herein are homogeneous solutions comprised of, for example, a solvent vehicle, such as water, ethylene glycol; and dimethyl sulfoxide; and a molecularly dissolved dye. The dyes selected for these inks must be of a sufficient polarity to enable their dissolution in the solvents selected. Accordingly, images obtained with these ink compositions usually have poor waterfastness characteristics. Additionally, extensive dye and solvent diffusion into the paper substrate causes undesirable ink spreading thereby resulting in low image resolution and inferior edge acuity. The two-phase ink compositions of the present invention resolve these problems.

SUMMARY OF THE INVENTION

It is an object of the present invention to provide ink compositions, which overcome many of the above-noted disadvantages.

In another object of the present invention there are provided ink compositions containing complexes therein, which compositions are useful in jet printing systems.

Further, in still another object of the present invention there are provided ink compositions with excellent waterfastness characteristics.

A further object of the present invention resides in the provision of ink compositions with acceptable dot and edge definition.

A still further object of the present invention resides in the provision of ink compositions with reduced ink spreading properties.

Another important object of the present invention is the provision of heterophase ink compositions with a dye covalently attached to a poly(ethylene glycol), which glycol is complexed with a heteropolyanion.

In still another important object of the present invention there are provided colored ink compositions with diameters of 0.08 to about 0.8 micron or less thereby enabling their use, for example, in ink jet printing processes without nozzle clogging.

In a further object of the present invention there are provided processes for the preparation of ink jet compositions containing insoluble dye complexes.

A further object of the present invention is the provision of heterophase ink compositions wherein the print quality of the images developed are independent of the ink paper interactions thereby permitting these inks to be selected for plain paper processes.

These and other objects of the present invention are accomplished by the provision of novel ink compositions for jet printing comprised of complexes, and to processes for preparing these compositions. More specifically, in one embodiment the present invention is directed to heterophase ink compositions comprised of aqueous suspensions of a dye attached, or covalently bonded to a component selected from poly(ethylene glycol), poly(ethylene imines) and phosphotungstic acid, which component is complexed with a heteropolyanion. There is thus provided in one embodiment of the present invention a heterophase ink composition useful for jet printing processes, and comprised of the aforementioned dye complex dispersed in an aqueous solution.

With further respect to the present invention in another embodiment there is provided a heterophase ink composition comprised of water and a dye covalently attached to a component selected from the group consisting of poly(ethylene glycols) and poly(ethylene imines), which component is complexed with a heteropolyanion.

In another specific embodiment of the present invention there is provided a process for the preparation of ink compositions for ink jet printing which comprises generating a complex by reacting a dye with components such as poly(ethylene glycols) or poly(ethylene imines), and thereafter complexing the component.

In another embodiment of the present invention there is provided a process for the preparation of particles for ink jet printing comprised of a dispersion in water of insoluble complexes of dyes, resulting from the reaction of a dye covalently bound to poly(ethylene glycol) chains and a water soluble inorganic compound. Water soluble additives may also be present, such as for example antioxidants, biocides, and/or viscosity controlling agents.

Illustrative examples of complexing compositions, present in an amount of, for example, from about 1 to about 20 percent by weight that may be selected in forming the dye complex include heteropolyanions such as phosphotungstic acid, phosphomolybdic acid, silico tungstic acid, dichromic acid, or their salts such as the sodium or potassium salts thereof. Other known complexing agents for polyethylene oxide can be found in the literature, see for example M. Stainer, L. C. Hardy, D. H. Whitmore, and D. F. Shriver, *J. Electrochem Soc., Electrochem, Science Techn.*, 131 (4) 784–790 (1984); C. B. Shaffer and F. H. Critchfield, *Analyt. Chem.*, 19(10) 32–34 (1947); and include sodium tetraphenylborate, cobalt thiocyanate, potassium tetraiodo bismuthate (III), and the like.

Generally, the poly(ethylene glycols), and poly(ethylene imines) selected are of a molecular weight of from about 200 to 1,000.

Examples of dye components that may be selected are azo, xanthene, methine, polymethine, and anthraquinone dyes. Illustrative examples of azo chromophores include solvent yellow 2, solvent yellow 58, solvent red 19, solvent red 27, disperse yellow 60, disperse orange 5, disperse orange 30, disperse orange 138, disperse red 1, disperse red 13, disperse red 41, disperse red 58, disperse red 72, disperse red 73, disperse red 90, disperse red 156, disperse red 210, disperse black 4, disperse black 7, disperse blue 183, disperse blue 165, dispersol fast red R, SRA brilliant blue 4, and pigment red 100; and the like. Illustrative examples of xanthene dyes include basic red 1, basic red 8, solvent red 45, and the like. Examples of methine and polymethine dyes include disperse yellow 31, disperse yellow 61, disperse yellow 99, basic violet 7, basic violet 16, and the like. Specific examples of anthraquinone dyes are solvent red 52, solvent violet 13, solvent blue 36, solvent blue 69, solvent green 3, pigment red 89, disperse red 4, disperse violet 6, disperse blue 3, disperse blue 6, disperse blue 23, disperse blue 28, disperse blue 34, disperse blue 60, disperse blue 73, reactive blue 6, and the like.

Other components of the inks include viscosity controlling agents, surface tension additives, biocides and antioxidants, reference for example copending application U.S. Ser. No. 797,312 relating to ink jet compositions, the disclosure of which is totally incorporated herein by reference.

With further reference to a specific ink composition of the present invention, it contains from about 5 to about 20 percent by weight of phosphotungstic acid, from about 10 to about 30 percent by weight of poly(ethylene glycol), from about 10 to about 30 percent by weight of dye, and from about 60 percent by weight to about 85 percent by weight of water.

A preferred process embodiment of the present invention comprises (1) preparing an aqueous solution with from about 70 to 98 percent by weight of water, of a dye component covalently attached to a poly(ethylene glycol), which component is present in an amount of from about 2 to 30 percent by weight; (2) preparing an aqueous solution of phosphotungstic acid heteropolyanion present in an amount of from about 5 to about 30 percent by weight; (3) mixing the two solutions in amounts such that the resulting aqueous suspension contains phosphotungstic acid in an amount from about 2 to about 25 percent by weight and the dye covalently attached to poly(ethylene glycol) in an amount of from about 1 to about 20 percent by weight; (4) purifying the resulting insoluble complexes by two consecutive cycles of centrifugation, decantation, and dispersion in water; (5) adjusting the concentration of insoluble complexes in water to an amount of from about 5 to about 20 percent by weight and adding to the resulting dispersion water soluble components, such as biocides, antioxidants, viscosity controlling reagents, and surface tension controlling reagents to enable inks that are very useful known ink jet printers.

Poly(ethylene glycol) dye derivatives can be prepared by following in part known procedures, such as those described in the German Pat. No. 28 0673 (1979) to Bayer or Japanese Publication No. 57 135 863 (1982) to Nippon Kagaku, the disclosures of which are totally incorporated herein by reference. This preparation involves the reaction of a mono functionalized methoxy poly(ethylene glycol) $CH_3O-(CH_2CH_2-O)_n-CH_2CH_2-X$, where n is the average number of ethylene oxide units and X is a leaving group such as chloride, bromide, tosylate, mesylate, and the like.

One preferred process embodiment of the present invention involves (1) preparing methoxy poly(ethylene glycol) tosylate by stirring, for a period of about 10 to about 30 hours at a temperature of from about 10° to about 40° C., a solution in dichloromethane of methoxy poly(ethylene glycol) in an amount of from about 5 to about 20 percent by weight, paratoluenesulfonyl chloride in an amount of from about 5 to about 20 percent by weight and pyridine in an amount of from about 2 to about 10 percent by weight, washing the dichloromethane solution with water, aqueous hydrochloric acid, and brine and concentrating it to dryness in a rotary evaporator, (2) heating in methyl cellosolve for a duration of from about 3 to about 10 hours at a temperature of from about 50° to about 100° C. a dye derivative such as 1,4-diamino-2,3-dicyanoanthraquinone in an amount of from about 1 to about 10 percent by weight and potassium carbonate in an amount of from about 1 to about 5 percent by weight, then cooling the resulting blue solution to room temperature and adding it to a solution in methyl cellosolve of methoxy poly(ethylene glycol) tosylate in an amount of from about 1 to about 10 percent by weight, stirring the mixture at room temperature for a duration of from about 12 to about 20 hours and evaporating the solvent in a rotary evaporator, and (3) subsequently purifying the resulting solid by heating it in boiling water in an amount of from about 10 to about 30 percent by weight for a duration of from about 30 minutes to about 2 hours and removing the insoluble impurities by hot filtration.

The particle sizes of the materials prepared can be determined by various known techniques, however, in accordance with the process of the present invention these sizes were measured with electron microscopy. Other properties associated with the ink compositions of the present invention include a pH of from about 4 to about 10, a surface tension of from about 45 dynes/cm to about 65 dynes/cm, and a viscoity of from about 1 to about 10 centipoises.

Furthermore, the ink compositions of the present invention have excellent waterfastness, that is they adhere to the substrate surface in view of the presence of water insoluble dye complexes. The colored ink particles also have self-binding properties toward paper which means that once they are laid down they resist removal from the paper. Moreover, the ink particles, in view of their diameters, were found to be very useful in ink jet printing systems since, for example, the ink jet nozzles directing the ink remained essentially open and unclogged. Also, the size of the resulting particles specified herein before enabled them to penetrate the spaces between the fibers contained on the paper substrate allowing a desirable matte finish.

The following examples are being supplied to further define various species of the present invention, it being noted that these examples are not intended to limit the scope of the present invention; parts and percentages are by weight unless otherwise indicated.

EXAMPLE I

Preparation of N-[ω-methoxy poly(ethylene glycol)] 1,4-diaminoanthraquinone-2,3-dicarboximide ($n=6.2$, n is the average number of ethylene oxide units in the poly(ethylene glycol) chain Methoxy poly(ethylene glycol) (5.10 grams Carbowax 350 from Union Carbide) was dried by two consecutive azeotropic distillations with toluene (20 milliliters) thus permitting the removal of the water present in the Carbowax. The resulting oil was added to dichloromethane (20 milliliters) containing dry pyridine (2.4 grams) and p-toluene sulfonyl chloride (5.4 grams). This reaction mixture was stirred at room temperature for 20 hours. Subsequently the reaction mixture was diluted with dichloromethane (60 milliliters), washed with water (three times, 25 milliliters), dilute aqueous hydrochloric acid (twice, 25 milliliters), and saturated aqueous sodium chloride (once, 25 milliliters). The dichloromethane organic layer was then dried over magnesium sulfate, filtered, and evaporated to yield methoxy poly(ethylene glycol) tosylate ($n=6.2$) as a colorless oil. Thereafter, a suspension of 1,4-diamino-2,3-dicyanoanthraquinone (1.0 gram), and anhydrous potassium carbonate (1.46 grams) in methyl cellosolve was heated at 70° C. under nitrogen for 5 hours. To the deeply colored resulting cyan solution obtained was added a solution of the prepared methoxy poly(ethylene glycol) tosylate ($n=6.2$) (2.0 grams) in methyl cellosolve (5 milliliters). The reaction mixture was kept at 80° C. for 18 hours, then it was cooled to room temperature. The methyl cellosolve was then evaporated. The resulting dark blue amorphous solid was treated with boiling water (20 milliliters) for 10 minutes, and filtered hot to remove water insoluble contaminants. The dark blue filtrate ($\lambda_{max}$ 670 nanometers) was concentrated to dryness yielding the dye-poly(ethylene glycol).

EXAMPLE II

Preparation of N-[ω-methoxy poly(ethylene glycol) 1,4-diaminoanthraquinone-2,3-dicarboximide ($n=10.7$)

Methoxy poly(ethylene glycol), $n=10.7$ (5.10 grams, Carbowax 550 from Union Carbide) was dried by two consecutive azeotropic distillations with toluene (20 milliliters) for permitting the removal of the water present in the Carbowax. The resulting oil was added to dichloromethane (20 milliliters) containing dry pyridine (2.0 grams) and p-toluene sulfonyl chloride (3.5 grams). This reaction mixture was then stirred at room temperature for 20 hours. Subsequently, the resulting mixture was diluted with dichloromethane (60 milliliters), washed with water (three times, 25 milliliters), dilute aqueous hydrochloric acid (twice, 25 milliliters), and saturated aqueous sodium chloride (once, 25 milliliters). The organic layer formulated was then dried over magnesium sulfate, filtered, and evaporated yielding methoxy poly(ethylene glycol) tosylate ($n=10.7$) as a colorless oil. Thereafter, a suspension of 1,4-diamino-2,3-dicyanoanthraquinone (1.0 gram), and anhydrous potassium carbonate (1.46 grams) in methyl cellosolve was heated at 70° C. under nitrogen for 5 hours. To the deeply colored cyan solution obtained was added a solution of methoxy poly(ethylene glycol) tosylate ($n=10.7$) (2.0 grams) in methyl cellosolve (5 milliliters). The reaction mixture was kept at 80° C. for 18 hours, then it was cooled to room temperature. The methyl cellosolve was then evaporated. The resulting dark blue amorphous solid was treated with boiling water (20 milliliters) for 10 minutes, and filtered hot to remove water insoluble contaminants. The dark blue filtrate ($\lambda_{max}$ 670 nanometers) was concentrated to dryness to yield the dye-poly(ethylene glycol).

EXAMPLE III

Preparation of N-[ω-methoxy poly(ethylene glycol)] 1,4-diaminoanthraquinone-2,3-dicarboximide ($n=15.3$)

Methoxy poly(ethylene glycol), $n=15.3$ (5.10 grams, Carbowax 750 from Union Carbide) was dried by two consecutive azeotropic distillations with toluene (20 milliliters) for permitting the removal of the water present in the Carbowax. The resulting oil was then added to dichloromethane (20 milliliters) containing dry pyridine (1.8 grams) and p-toluene sulfonyl chloride (2.5 grams). This reaction mixture was then stirred at room temperature for 20 hours. Subsequently, the reaction mixture was diluted with dichloromethane (60 milliliters), washed with water (three times, 25 milliliters), dilute aqueous hydrochloric acid (twice, 25 milliliters), and saturated aqueous sodium chloride (once, 25 milliliters). The organic layer was then dried over magnesium sulfate, filtered, and evaporated to yield methoxy poly(ethylene glycol) tosylate $n=15.3$ as a colorless oily solid. Thereafter, a suspension of 1,4-diamino-2,3-dicyanoanthraquinone (1.0 gram) and anhydrous potassium carbonate (1.46 grams) in methyl cellosolve was heated at 70° C. under nitrogen for 5 hours. To the deeply colored cyan solution obtained was added a solution of methoxy poly(ethylene glycol) tosylate (n=15.3) (2.0 grams) in methyl cellosolve (5 milliliters). The reaction mixture was kept at 80° C. for 18 hours, then it was cooled to room temperature. The methyl cellosolve was evaporated. The resulting dark blue amorphous solid was treated with boiling water (20 milliliters) for 10 minutes, and filtered hot to remove water insoluble contaminants. The dark blue filtrate ($\lambda_{max}$ 670 nanometers) was concentrated to dryness yielding the dye-poly(ethylene glycol).

EXAMPLE IV

Preparation of 1-amino-4-hydroxy-2-[O- ω-methoxy poly(ethylene glycol)]anthraquinone (n=1.53)

Methoxy poly(ethylene glycol), n=15.3 (17.0 grams, Carbowax 750 from Union Carbide) was dried by two consecutive azeotropic distillations with toluene (30 milliliters) for permitting the removal of the water present in the Carbowax. Potassium hydroxide (1.7 grams) was added to the dried Carbowax. The mixture was then heated to 120° C. under nitrogen for 1 hour to yield an amber solution to which was added 1-amino-4-hydroxy-2-phenoxyanthraquinone (2.0 grams). A deep blue solution was formed initially. After about 15 minutes a heavy precipitate was produced. The mixture was diluted with water (100 milliliters). Thereafter, the reaction mixture was brought to a neutral pH of 7 with aqueous hydrochloric acid. Extractions with diethyl ether followed by evaporation of the solvent yielded magenta dye-poly(ethyene glycol) ($\lambda_{max}$ 540 nanometers) which was used to prepare the ink formulations.

EXAMPLE V

Cyan Ink Formulation

A solution of phosphotungstic acid (10.0 milliliters, 4 percent in water) was added dropwise to an aqueous solution of the dye-poly (ethyleneglycol) (0.5 gram) in water (5 milliliters). Cyan colored particles precipitated immediately. The mixture was subjected to centrifugation, decantation, and three consecutive washes with water (10 milliliters). The resulting particles were dispersed in water (10 milliliters) and jetted in a Diablo C-150 ink jet printer. The above prepared ink jet ink having a composition of 15 percent by weight dye-complex and 85 percent by weight water was then incorporated into a Diablo C-150 ink jet printer and jetted. The resulting cyan prints on 4024 ® paper had good edge acuity. showed no feathering, possessed a waterfastness of 95 percent, and had an optical density of 0.8. The spot size was 30 percent smaller than the commercial inks supplied with the Diablo C-150.

EXAMPLE VI

Magenta Ink Formulation

A solution of phosphotungstic acid (10.0 milliliters, 4 percent in water) was added dropwise to an aqueous solution of the dye-poly (ethylene glycol) (0.5 gram) in water (5 milliliters). Magneta colored particles precipitated immediately. The mixture was subjected to centrifugation, decantation, and three consecutive washes with water (10 milliliters). The resulting magenta particles were dispersed in water (10 milliliters) and jetted in a Diablo ink jet printer. The above prepared ink jet ink having a composition of 15 percent by weight magenta dye complex and 85 percent by weight water was then incorporated into a Diablo C-150 ink jet printer and jetted. The resulting magenta prints on 4024 ® paper had good edge acuity, showed no feathering, possessed a waterfastness of 97 percent, and had an optical density of 0.8. The spot size was 30 percent smaller than the commercial inks supplied with the Diablo C-150.

Other modifications of the present invention may occur to those skilled in the art subsequent to a review of the present application. These modifications, and equivalents thereof are intended to be included within the scope of the present invention.

What is claimed is:

1. A heterophase ink composition comprised of water and a dye covalently attached to a component selected from the group consisting of poly(ethylene glycols) and poly(ethylene imines), which component is complexed with a heteropolyanion selected from the group consisting of phosphotungstic acid, phosphomolybdic acid, silico tungstic acid, dichromic acid and the salts thereof.

2. An ink composition in accordance with claim 1 wherein the complex formulated is insoluble in water.

3. An ink composition in accordance with claim 1 wherein the salts are selected from sodium and potassium.

4. An ink composition in accordance with claim 1 wherein the complex is formulated from phosphotungstic acid and N-[ω-methoxy poly(ethylene glycol)]1,4-diaminoanthraquinone-2,3-dicarboximide.

5. An ink composition in accordance with claim 1 wherein the complex is formulated from phosphotungstic acid and 1-amino-4-hydroxy-2-[O-ω-methoxypoly(ethylene glycol)]anthraquinone.

6. An ink composition in accordance with claim 1 wherein the complex is formulated from phosphomolybdic acid and N-[ω-methoxy poly(ethylene glycol)]1,4-diaminoanthraquinone-2,3-dicarboximide.

7. An ink composition in accordance with claim 1 wherein water is present in an amount of from about 80 to about 95 percent by weight, and the dye is present in an amount of from about 5 to about 20 percent by weight.

8. An ink composition in accordance with claim 1 wherein the dye is N-methoxy poly(ethylene glycol) 1,4-diaminoanthraquinone-2,3-dicarboximide.

9. An ink composition in accordance with claim 1 wherein the dye is 1-amino 4-hydroxy-2-[O-ω-methoxy poly(ethylene glycol)] anthraquinone.

10. An ink composition in accordance with claim 1 wherein the dye is selected from the group consisting of a yellow dye, a green dye, a red dye, a black dye, a cyan dye, a magenta dye, a blue dye, and mixtures thereof.

11. An ink composition in accordance with claim 1 wherein the diameter of the complex is from about 0.08 micron to about 0.8 micron.

12. An ink composition in accordance with claim 1 wherein there is further incorporated into the ink composition humectants, biocides, and surface tension control agents.

13. A process for the preparation of particulate inks for ink jet printing which comprises (1) mixing from about 5 to about 20 percent by weight of an aqueous solution of phosphotungstic acid and from about 10 to about 30 percent by weight of an aqueous solution of a dye-poly(ethylene glycol) enabling the resulting aqueous suspension to contain phosphotungstic acid in an amount of from about 2 to about 25 percent by weight and the dye-poly(ethylene glycol) in an amount of from about 1 to about 20 percent by weight; (2) purifying the resulting insoluble complexes by two consecutive cycles of centrifugation, decantation, and dispersion in water; and (3) subsequently adjusting the concentration of insoluble complexes in water to an amount of from about 5 to about 20 percent by weight.

* * * * *